US007963191B2

(12) United States Patent
Holmes

(10) Patent No.: US 7,963,191 B2
(45) Date of Patent: Jun. 21, 2011

(54) HYBRID POWERTRAIN AND DUAL CLUTCH TRANSMISSION

(75) Inventor: Alan G. Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 373 days.

(21) Appl. No.: 12/327,636

(22) Filed: Dec. 3, 2008

(65) Prior Publication Data

US 2010/0132492 A1 Jun. 3, 2010

(51) Int. Cl.
*F16H 3/08* (2006.01)
*F16H 37/06* (2006.01)

(52) U.S. Cl. ............................................. 74/661; 74/331
(58) Field of Classification Search .................. None
See application file for complete search history.

(56) References Cited

U.S. PATENT DOCUMENTS 6,427,547 B1 * 8/2002 Bowen ............................. 74/329
6,427,549 B1 * 8/2002 Bowen ............................. 74/331

* cited by examiner

Primary Examiner — Dirk Wright

(57) ABSTRACT

An automatic dual clutch transmission includes an input clutch which selectively connects a prime mover to an electric motor. The electric motor output, in turn, drives a pair of gears, one of which is in constant mesh with a first gear on a first quill and a second gear on a second quill, the other being in constant mesh with a third gear on the first quill and a fourth gear on the second quill. On each quill, between each pair of gears driven by the input is a pair of dog clutches which connect one of the two gears to the associated quill. Each of the quills drives an input of a respective pair of friction clutches which drive a respective pair of layshafts or countershafts. A similar arrangement of a second pair of gears flanked by dog clutches connects each layshaft or countershaft through one of a pair of gears which are in constant mesh with a pair of output gears coupled to and driving a differential cage.

19 Claims, 3 Drawing Sheets

| GEAR | 52 | 54 | 34 | 42 | 36 | 44 | 62 | 72 | 64 | 74 |
|---|---|---|---|---|---|---|---|---|---|---|
| 1 | X |   | X |   |   |   | X |   |   |   |
| 2 |   | X |   | X |   |   |   | X |   |   |
| 3 | X |   |   |   | X |   | X |   |   |   |
| 4 |   | X |   |   |   | X |   | X |   |   |
| 5 | X |   | X |   |   |   |   |   | X |   |
| 6 |   | X |   | X |   |   |   |   |   | X |
| 7 | X |   |   |   | X |   |   |   | X |   |
| 8 |   | X |   |   |   | X |   |   |   | X |

FIG. 3

HYBRID POWERTRAIN AND DUAL CLUTCH TRANSMISSION

FIELD

The present disclosure relates to a powertrain and transmission for a motor vehicle and more particularly to a hybrid powertrain and dual clutch transmission for a motor vehicle.

BACKGROUND

The statements in this section merely provide background information related to the present disclosure and may or may not constitute prior art.

Within the motor vehicle automatic transmission art, the dual clutch transmission (DCT) is a relative newcomer. A typical dual clutch transmission configuration includes a pair of mutually exclusively operating input clutches which drive a pair of layshafts or countershafts disposed on opposite sides of an output shaft. One of each of a plurality of pairs of constantly meshing gears which define the various forward gear ratios is freely rotatably disposed on one of the layshafts and the other of each pair of gears is coupled to the output shaft. A plurality of dog clutches selectively couple one of the gears to the layshaft to achieve a forward gear ratio. After the dog clutch is engaged, the input clutch associated with the active layshaft is engaged.

Dual clutch transmissions are known for their sporty, performance oriented shift characteristics. They typically exhibit good fuel economy due to good gear mesh efficiency and ratio selection flexibility in design. The dog clutches have low spin losses which also contributes to overall operating efficiency.

However, dual clutch transmissions have several unique design considerations. For example, because of the torque throughput during launch and the heat that can be generated during slip, the input clutches must be of a relatively large size. The size requirement applies as well to the cooling system which must be able to dissipate relatively large quantities of heat. Finally, because such transmissions typically have many sets of axially aligned gears, their overall length may be problematic in some platform configurations.

The present invention is directed not only to providing a dual clutch automatic transmission have reduced axial length but also to such a transmission for incorporation into a hybrid powertrain.

SUMMARY

The present invention provides an automatic dual clutch transmission having an input clutch which selectively connects a prime mover such as a gas, Diesel of flexible fuel engine to an electric motor. The input clutch may be disengaged when only electric motor operation is desired. The electric motor output, in turn, drives a pair of gears, one of which is in constant mesh with a first gear on a first quill and a second gear on a second quill, the other being in constant mesh with a third gear on the first quill and a fourth gear on the second quill. Each of the quills is coupled to an input of a respective pair of friction clutches which drive an associated pair of layshafts or countershafts. On each quill, between each pair of gears driven by the input is a pair of dog clutches which connect one of the two gears to the associated quill. A similar arrangement of a second pair of gears flanked by dog clutches connects each layshaft or countershaft through one of a pair of gears which are in constant mesh with a pair of output gears coupled to and driving a differential cage. A dual clutch transmission and differential according to the present invention exhibits reduced axial length which is advantageous in hybrid powertrains. The transmission is especially suited for transverse installation in front wheel drive vehicles.

Thus it is an object of the present invention to provide a dual clutch automatic transmission.

It is a further object of the present invention to provide a dual clutch automatic transmission and electric drive motor.

It is a further object of the present invention to provide a dual clutch automatic transmission for use in a hybrid powertrain.

It is a further object of the present invention to provide a dual clutch automatic transmission having an integral differential.

It is a further object of the present invention to provide a dual clutch automatic transmission having reduced axial length.

It is a further object of the present invention to provide a dual clutch automatic transmission having an integral differential and reduced length.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a truth table presenting the various states of the two countershaft clutches and four dog clutches in the dual clutch transmission which achieve eight forward speeds or gear ratios;

DETAILED DESCRIPTION

The following description is merely exemplary in nature and is not intended to limit the present disclosure, application, or uses.

Figure 1:
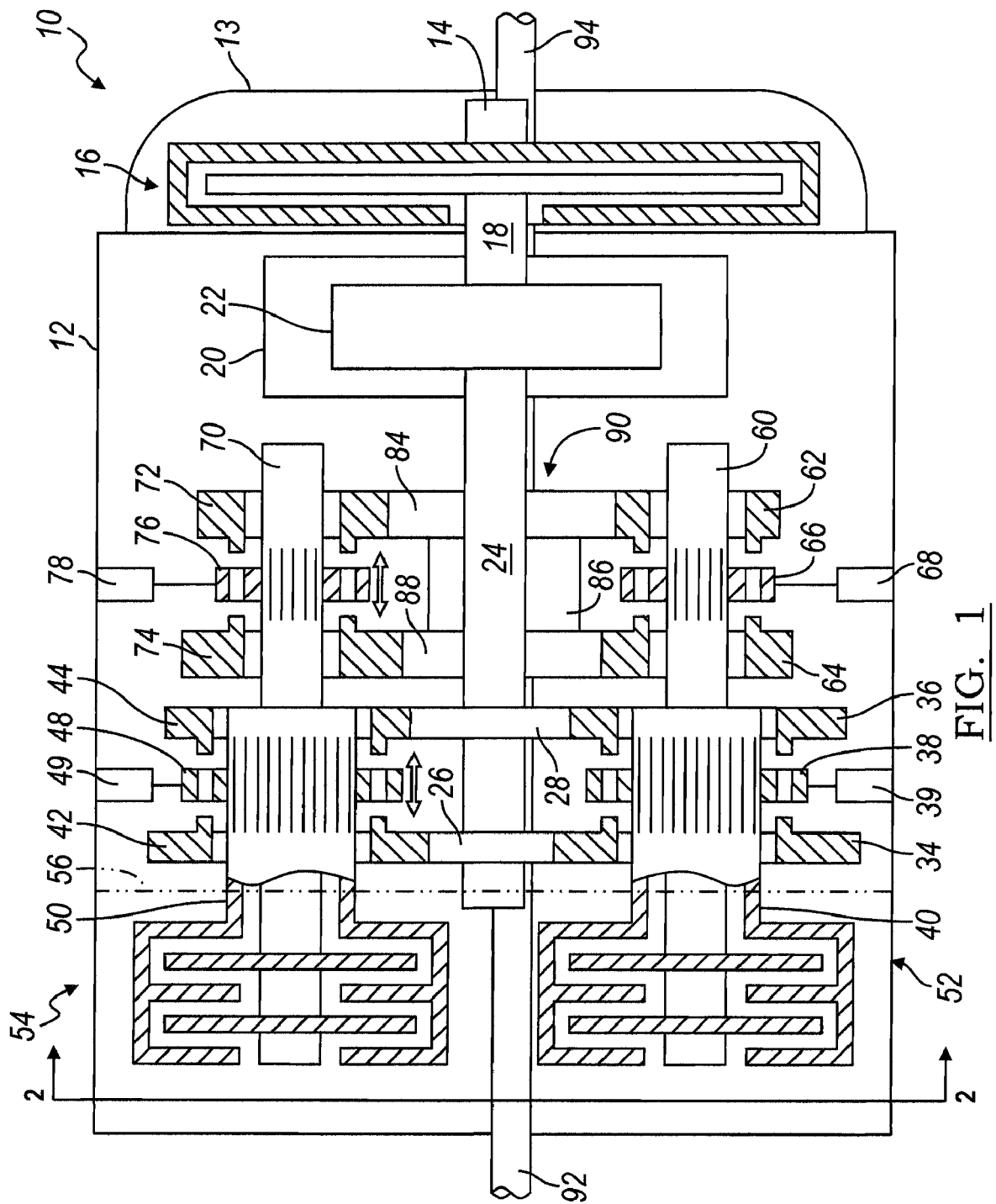
FIG. 1 is a schematic, top plan view of a dual clutch automatic transmission according to the present invention.
Figure 2:
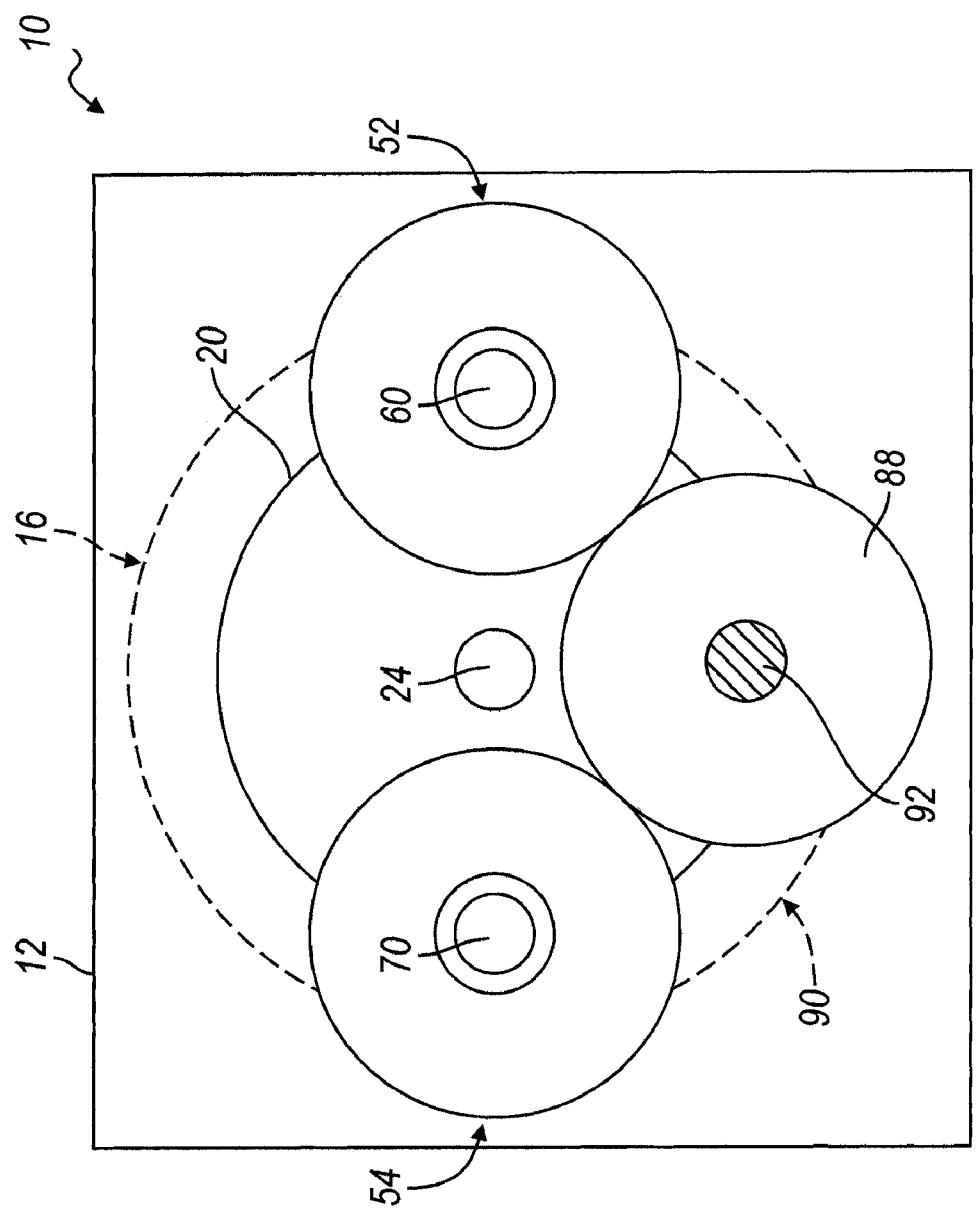
FIG. 2 is a schematic, end elevational view of a dual clutch automatic transmission according to the present invention taken along line 2-2 of FIG. 1.

Referring now to FIGS. 1 and 2, a dual clutch automatic transmission according to the present invention is illustrated and generally designated by the reference number 10. The dual clutch automatic transmission 10 includes a housing 12 which receives, supports and protects the various components of the automatic transmission 10. An input shaft or member 14 receives drive torque from a prime mover such as a gasoline, Diesel or flexible fuel engine (not illustrated) and connects to and drives an input clutch 16. The input clutch 16 which is preferably disposed within a bell housing 13 secured to the front of the transmission housing 12 selectively engages to provide drive torque from the prime mover to a clutch output shaft or member 18 that drives an electric motor 20. The electric motor 20 includes an armature 22 coupled to a main transmission input shaft 24. The electric motor 20 may be an induction motor or more preferably a permanent magnet or brushless DC motor. The main transmission input shaft 24 is coupled to and directly drives a first input drive gear 26 and a second input drive gear 28. The first input drive gear 26 is in constant mesh with a first input gear 34 which is freely rotatably disposed upon a first (odd) quill or drive tube 40 and a second input gear 42 which is freely rotatably disposed upon a second (even) quill or drive tube 50. The first input gear 34 is active when first and fifth gears have been selected and the second input gear 42 is active when second and sixth gears have been selected. Also freely rotatably disposed on the first quill or drive tube 40 and spaced from the first input gear 34 is a third input gear 36 which is in constant mesh with the second input drive gear 28. A fourth input gear 44 is freely rotatably disposed on the second quill or drive tube 50, spaced from the second input gear 42 and in constant mesh with the second input drive gear 28. The third input gear 36 is active when third and seventh gears have been selected and the fourth input gear 44 is active when fourth and eighth gears have been selected.

Between the first input gear 34 and the third input gear 36 is a first dog clutch 38. The first dog clutch 38 is conventional and operates to positively connect either the first input gear 34 or the third input gear 36 to the first quill or drive tube 40. Depending upon the sophistication of the control system and logic, the first dog clutch 38 and other dog clutches referenced below may be equipped with synchronizers to synchronize the speed of the elements of the dog clutches before they are engaged. Associated with the first dog clutch 38 is an operator and shift fork assembly 39 which axially and bi-directionally translates the first dog clutch 38 along the first quill or drive tube 40 and which may be either electric, hydraulic or pneumatic. Likewise, between the second input gear 42 and the fourth input gear 44 are a second dog clutch 48 and optional synchronizers. The second dog clutch 48 and the optional synchronizers are also conventional and operate to first synchronize and then positively connect the second input gear 42 or the fourth input gear 44 to the second quill or drive tube 50. An electric, hydraulic or pneumatic operator and shift fork assembly 49 is associated with the second dog clutch 48.

The first quill or drive tube 40 is connected to and directly drives an input of a first countershaft clutch assembly 52. The first countershaft clutch assembly 52 is preferably a multiple disc or plate friction clutch pack having an electric, hydraulic or pneumatic operator (not illustrated) which selectively connects the first quill or drive tube 40 to a first (odd) layshaft or countershaft 60. Similarly, the second quill or drive tube 50 is connected to and directly drives an input of a second countershaft clutch assembly 54. The second countershaft clutch assembly 54 is also preferably a multiple disc or plate friction clutch pack actuated by an electric, hydraulic or pneumatic operator (not illustrated) which selectively connects the second quill or drive tube 50 to a second (even) layshaft or countershaft 70.

FIG. 1 presents the first and second countershaft clutch assemblies 52 and 54 within the housing 12. So located, the clutch assemblies 52 and 54 will typically be wet plate clutches. It should be appreciated that an equally viable alternate construction comprehends a wall or bulkhead 56 (shown in phantom) which separates the first and second countershaft clutch assemblies 52 and 54 from the other components of the transmission 10 within a dedicated compartment or housing, to allow them to operate as dry plate clutches, to keep clutch debris from contaminating the oil within the transmission housing 12 and to facilitate their easy service by avoiding the need to remove the engine or transmission 10 from the vehicle.

Freely rotatably disposed on the first layshaft or countershaft 60 is a first output gear 62 which is in constant mesh with a first driven output gear 84 which is secured to and rotates with a cage or housing 86 of a differential assembly 90. Also freely rotatably disposed on the second layshaft or countershaft 70 is a second output gear 72 which is also in constant mesh with the first driven output gear 84 of the differential assembly 90. The first output gear 62 is active when fifth or seventh gear is selected and the second output gear 72 is active when sixth or eighth gear is selected. Spaced from the first output gear 62 and also freely rotatably disposed on the first countershaft 60 is a third output gear 64 which is in constant mesh with a second driven output gear 88 secured to the housing 86 of the differential assembly 90. Spaced from the second output gear 72 and freely rotatably disposed on the second countershaft 70 is a fourth output gear 74 which is in constant mesh with the second driven output gear 88. The third output gear 64 is active when first and third gears have been selected and the fourth output gear 74 is active when second and fourth gears have been selected.

Between the first output gear 62 and the third output gear 64 is a third dog clutch 66 and optional synchronizers. The third dog clutch 66 and optional synchronizers are conventional and operate to first synchronize and then connect either the first output gear 62 or the third output gear 64 to the first countershaft 60. An electric, hydraulic or pneumatic operator and shift fork assembly 68 is associated with the third dog clutch 66. Likewise, between the second output gear 72 and the fourth output gear 74 is a fourth dog clutch 76 and optional synchronizers. The fourth dog clutch 76 and optional synchronizers are conventional and operate to first synchronize and then connect either the second output gear 72 of the fourth output gear 74 to the second countershaft 70. An electric, hydraulic or pneumatic operator and shift fork assembly 78 is associated with the fourth dog clutch 76.

The differential assembly 90 and specifically the cage or housing 86 is driven through either the first driven gear 84 or the second driven gear 88, as noted. The differential assembly 90 includes four bevel gears (not illustrated) within the housing 86 disposed in pairs on two perpendicular axes. An opposed (co-axial) pair of the bevel gears are idler gears and the gears of a second opposed pair of bevel gears are coupled to and drive a first output shaft 92 and a second, coaxial output shaft 94. The output shafts 92 and 94 may be coupled to drive wheels through universal joints (all not illustrated).

It should be understood that reverse gear may be provided by any one of a number of alternate means. For example, the input clutch 16 may be disengaged and the electric motor 20 may be energized to rotate in reverse and drive through a low speed (high ratio) gear such as first or second gear. Alternatively, an additional (idler) gear and clutch (not illustrated) may be incorporated into the automatic transmission 10 to operate in conjunction with, for example, the input gear 34 and the output gear 64 on the first countershaft 60.

FIG. 3 is a truth table presenting a clutching scheme for the dual clutch automatic transmission 10. An "X" in a row for a particular speed or gear ratio indicates that the actuator and countershaft clutch or the actuator and dog clutch associated with the gear indicated by the column heading are activated and engaged. It will therefore be appreciated that for each forward gear or speed ratio two gears on either the first countershaft 60 or the second countershaft 70 will be engaged and active. For example, in first gear, the first input gear 34 and the third output gear 64 on the first (odd) countershaft 60 will be active and in second gear the second input gear 42 and the fourth output gear 74 on the second (even) countershaft 70 will be active.

The foregoing description of the invention is merely exemplary in nature and variations that do not depart from the gist of the invention are intended to be within the scope of the invention. Such variations are not to be regarded as a departure from the spirit and scope of the invention and the following claims.

What is claimed is:

1. A dual clutch automatic transmission comprising, in combination,
   a input clutch having an input adapted to be driven by an engine and an output,
   an electric motor coupled to said output of said input clutch and having an output shaft,
   a first drive gear and a second drive gear coupled to said output shaft,
   a first quill having a first input gear rotatably disposed thereon and in constant mesh with said first drive gear and a third input gear rotatably disposed thereon and in constant mesh with said second drive gear,
   a first dog clutch for connecting one of said first and third input gears to said first quill,
   a second quill having a second input gear rotatably disposed thereon and in constant mesh with first drive gear and a fourth input gear rotatably disposed thereon and in constant mesh with said second drive gear,
   a second dog clutch for connecting one of said second and fourth input gears to said second quill,
   a first countershaft disposed coaxially with said first quill and a first countershaft clutch for connecting said first quill and said first countershaft,
   a second countershaft disposed coaxially with said second quill and a second countershaft clutch for connecting said second quill and said second countershaft, a first output gear disposed on said first countershaft and in constant mesh with a first differential input gear,
   a second output gear disposed on said second countershaft and in constant mesh with said first differential input gear,
   a third output gear disposed on said first countershaft and in constant mesh with a second differential input gear,
   a fourth output gear disposed on said second countershaft and in constant mesh with a said second differential input gear,
   a third dog clutch assembly disposed on said first countershaft between said first and said third output gears for selectively connecting said first and third output gears to said first countershaft,
   a fourth dog clutch assembly disposed on said second countershaft between said second and said fourth output gears for selectively connecting said second and said fourth output gears to said second countershaft, and
   a differential assembly driven by said first and said second differential input gears and having a pair of coaxial outputs.

2. The dual clutch transmission of claim 1 wherein said dog clutch assemblies include a single dog clutch.

3. The dual clutch transmission of claim 1 wherein said dog clutch assemblies include an electric or hydraulic operator.

4. The dual clutch transmission of claim 1 wherein each of said input and output gears is utilized with two forward gear ratios.

5. The dual clutch transmission of claim 1 wherein said electric motor is bi-directional and provides reverse.

6. The dual clutch transmission of claim 1 wherein said first input gear is associated with first and fifth gears, said second input gear is associated with second and sixth gears, said third input gear is associated with third and seventh gears and said fourth input gear is associated with fourth and eighth gears.

7. The dual clutch transmission of claim 1 wherein said first output gear is associated with fifth and seventh gears, said second output gear is associated with sixth and eighth gears, said third output gear is associated with first and third gears and said fourth output gear is associated with second and fourth gears.

8. A dual clutch transmission comprising, in combination,
   an input shaft coupled to and driving a first drive gear and a second drive gear spaced from said first drive gear,
   a first quill having a first gear rotatably disposed thereon and in constant mesh with said first drive gear,
   a second quill having a second gear rotatably disposed thereon and in constant mesh with first drive gear and
   a third gear rotatably disposed on said first quill and in constant mesh with said second drive gear,
   a fourth gear rotatably disposed on said second quill and in constant mesh with said second drive gear,
   a first dog clutch disposed on said first quill between said first gear and said third gear for connecting said first gear or said third gear to said first quill,
   a second dog clutch disposed on said second quill between said second gear and said fourth gear for connecting said second gear or said fourth gear to said second quill,
   a first countershaft disposed coaxially with said first quill and a first countershaft clutch for connecting said first quill and said first countershaft,
   a second countershaft disposed coaxially with said second quill and a second countershaft clutch for connecting said second quill and said second countershaft,
   a first output gear rotatably disposed on said first countershaft and in constant mesh with a first differential input gear,
   a second output gear rotatably disposed on said second countershaft and in constant mesh with said first differential input gear,
   a third output gear rotatably disposed on said first countershaft and in constant mesh with a second differential input gear,
   a fourth output gear rotatably disposed on said second countershaft and in constant mesh with a said second differential input gear,
   a third dog clutch disposed on said first countershaft between said first and said third output gears for selectively connecting said gears to said first countershaft,
   a fourth dog clutch disposed on said second countershaft between said second and said fourth output gears for selectively connecting said gears to said second countershaft, and
   a differential assembly driven by said first and said second differential input gears and having a pair of coaxial outputs.

9. The dual clutch transmission of claim 8 wherein said dog clutch assemblies include an electric or hydraulic operator.

10. The dual clutch transmission of claim 8 wherein each of said input and output gears is utilized with two forward gear ratios.

11. The dual clutch transmission of claim 8 further including a bi-directional electric motor which provides reverse.

12. The dual clutch transmission of claim 8 wherein said first input gear is associated with first and fifth gears, said second input gear is associated with second and sixth gears, said third input gear is associated with third and seventh gears and said fourth input gear is associated with fourth and eighth gears.

13. The dual clutch transmission of claim 8 wherein said first output gear is associated with fifth and seventh gears, said second output gear is associated with sixth and eighth gears, said third output gear is associated with first and third gears and said fourth output gear is associated with second and fourth gears.

14. The dual clutch transmission of claim 8 further including a main clutch and an electric motor operably disposed between said main clutch and said input shaft.

15. A dual clutch transmission comprising, in combination,
an input shaft coupled to and driving a first drive gear and a second drive gear,
a first quill having a first pair of input gears rotatably disposed thereon, one of said first pair of input gears in constant mesh with each of said first and second drive gears,
a first dog clutch disposed on said first quill between said first pair of input gears for selectively connecting one of said first pair of input gears to said first quill,
a second quill having a second pair of input gears rotatably disposed thereon, one of said second pair of input gears in constant mesh with each of said first and second drive gears,
a second dog clutch disposed in said second quill between said second pair of input gears for selectively connecting one of said second pair of input gears to said second quill,
a first countershaft disposed coaxially with said first quill and a first countershaft clutch for selectively connecting said first quill and said first countershaft,
a second countershaft disposed coaxially with said second quill and a second countershaft clutch for selectively connecting said second quill and said second countershaft,
a first pair of output gears rotatably disposed on said first countershaft, one of said first pair of output gears in constant mesh with a first differential input gear and a second differential input gear,
a third dog clutch disposed on said first countershaft between said first pair of output gears for selectively connecting said gears to said first countershaft,
a second pair of output gears rotatably disposed on said second countershaft, one of said second pair of output gears in constant mesh with said first differential input gear and said second differential input gear,
a fourth dog clutch disposed on said second countershaft between said second pair of output gears for selectively connecting said gears to said second countershaft, and
a differential assembly driven by said first and said second differential input gears and having a pair of outputs.

16. The dual clutch transmission of claim 15 further including a main clutch and an electric motor operably disposed between said main clutch and said input shaft.

17. The dual clutch transmission of claim 16 wherein said electric motor is bi-directional and provides reverse.

18. The dual clutch transmission of claim 15 wherein said dog clutch assemblies include an electric or hydraulic operator.

19. The dual clutch transmission of claim 15 wherein each of said input and output gears is utilized with two forward gear ratios.

* * * * *